United States Patent [19]

Gaudet et al.

[11] Patent Number: 5,549,353
[45] Date of Patent: Aug. 27, 1996

[54] CAR SEAT MAT

[75] Inventors: Pierre Gaudet; Nathalie Léveillé, both of Crabtree, Canada

[73] Assignee: 3156729 Canada Inc., Ste-Anne des lacs, Canada

[21] Appl. No.: 520,173

[22] Filed: Aug. 28, 1995

[51] Int. Cl.$^6$ ..................................................... B60N 2/28
[52] U.S. Cl. ................ 297/182; 297/219.1; 297/219.12; 297/256.16
[58] Field of Search ................................ 297/182, 219.1, 297/219.12, 256.16, 250.1; 108/24, 26

[56] References Cited

U.S. PATENT DOCUMENTS

| | | | |
|---|---|---|---|
| 2,938,574 | 5/1960 | Brown | 297/182 |
| 4,955,666 | 9/1990 | Baker | 297/182 |
| 5,004,197 | 4/1991 | Weekley | 297/250.1 |
| 5,005,903 | 4/1991 | Minardi | 297/250.1 |
| 5,188,421 | 2/1993 | Arseneault | 297/182 |
| 5,222,745 | 7/1993 | Hazel | 297/219.12 X |

FOREIGN PATENT DOCUMENTS 1294206  1/1992  Canada .

*Primary Examiner*—Peter R. Brown
*Attorney, Agent, or Firm*—Francois Martineau

[57] ABSTRACT

A car seat mat for use with a child's restraint seat over the seat of an automobile, consisting of a flexible waterproof sheet. This sheet has a main, generally quadrangular section and a lip portion coextensive with the main section. The sheet lip portion is sized for conforming to the seat portion of the child's restraint seat, and the sheet main portion is sized for overlapping the vertical car body panel straddling the front end of the car fixed seat and the car flooring. A first, transverse, substantially rigid flange extends in between the sheet main portion and the sheet lip portion, and a second, substantially rigid flange extends at an end edge section of the mat opposite said first flange. The first flange is sized for flat abutment against the front end portion of the child's restraint seat, and the second flange is adapted to form a water collecting pocket in spaced overlying fashion relative to the car flooring. The sheet accordingly shields the car seat and straddling car body vertical panel from accidental sand and dirt spills generated by the bare feet, shoes or boots of an infant sitting in the child's restraint seat.

10 Claims, 2 Drawing Sheets

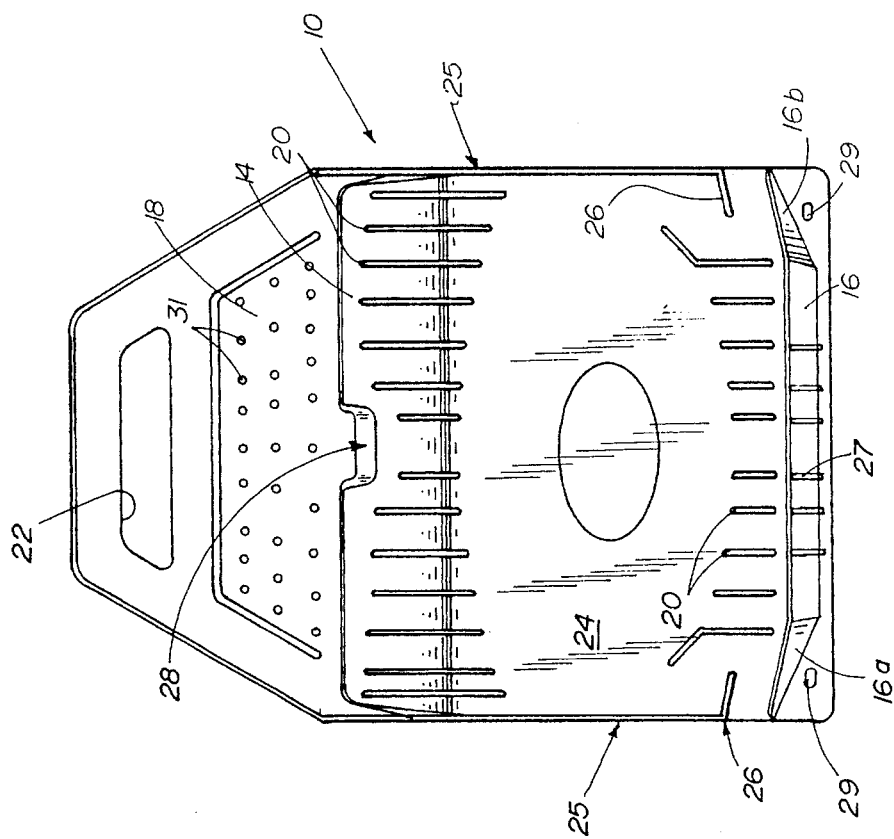
FIG. 1
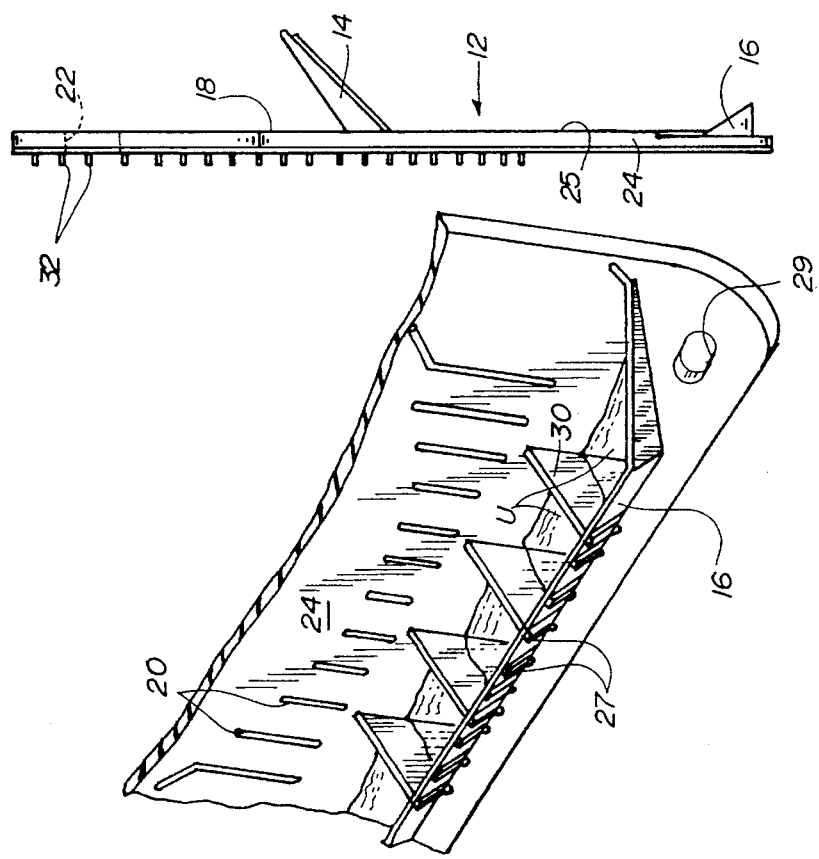
FIG. 2
FIG. 3

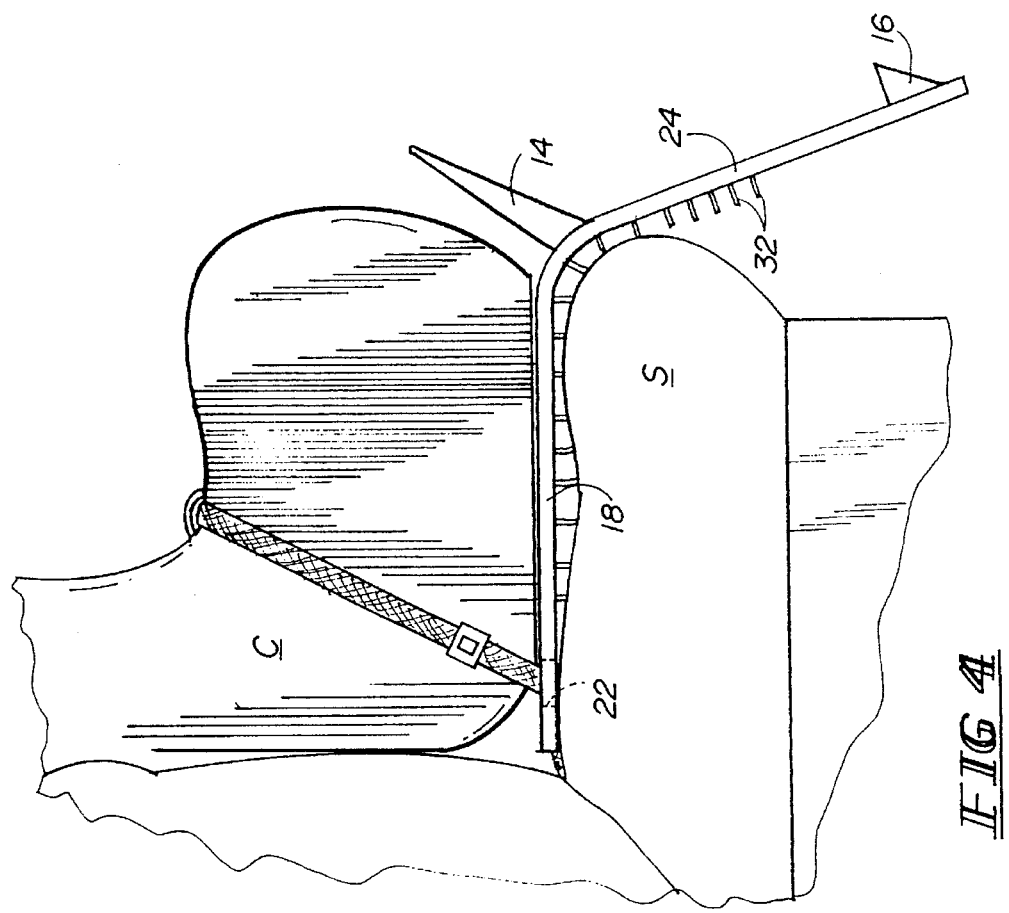
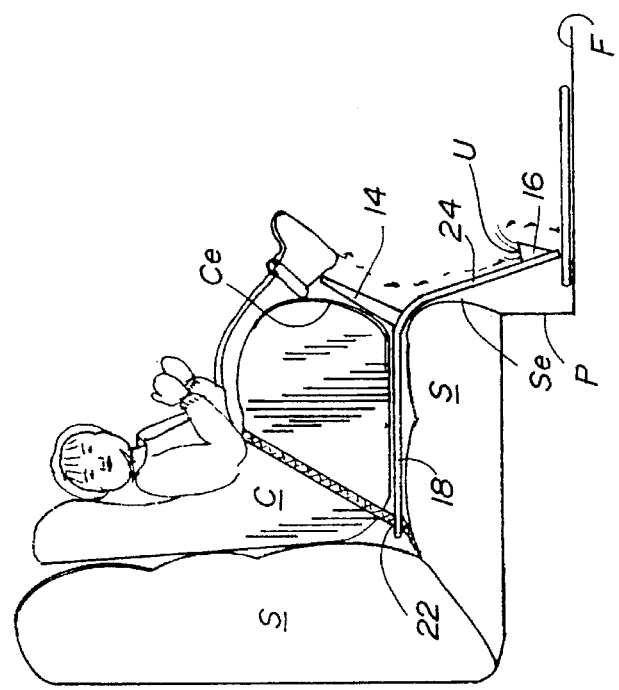

CAR SEAT MAT

FIELD OF THE INVENTION

This invention relates to waterproof car mats, particularly those for use with a removable child's restraint seat over the fixed rear seat of an automobile.

BACKGROUND OF THE INVENTION

Canadian patent No 1,294,206 issued 14 Jan. 1992 to Norman LAW, discloses a pivotable child's restraint seat for mounting to the fixed back seat of an automobile. The pivotable seat is movable between an inoperative retracted position, in which it fits inside a recess in the backrest part of the fixed seat, and an operative extended position, in which it extends forwardly in overlying fashion over the seat part of the fixed seat. A flexible fabric mat sheet is attached by a hook and loop fastener to the front seat end of the pivotable child seat, to overlap and provide spill protection to the front portion of the car back seat against accidental mud and snow spills from the child's boots, when the infant sits on the pivotable child seat in its extended operative condition.

Such flexible fabric mat sheet does provide some protection against accidental dirt spills to the fixed car seat. However, this protection is of limited value in some instances, since:

(a) some backflow of liquid dirt spills may occur over the top inner end portion of the fabric mat sheet, beneath the child's restraint seat, and particularly through the hook and loop fastening members. This will stain the surface of the car fixed seat beneath the child's restraint seat.

(b) due to the short length of the fabric mat sheet, the vertical car body panel straddling the front end of the car fixed seat and the car flooring, will remain unprotected. Extending the length of the fabric mat sheet is not the solution, since in that case, the fabric mat sheet will be liable to be accidentally displaced and become offsetted for various reasons, including:

inertial forces, associated with displacement of the automobile on the road; and movements of the child's legs, which may strike the fabric mat sheet.

OBJECT OF THE INVENTION

The gist of the invention is therefore to provide an improved car seat mat, for use beneath a child's restraint seat, that will effectively protect the car seat and straddling vertical body panel between the car seat and car flooring, against accidental dirt spills from the bare feet, shoes or boots of the child sitting on its restraint seat.

SUMMARY OF THE INVENTION

Accordingly with the object of the invention, there is disclosed a car seat mat for use with a removable child's restraint seat over an integral fixed seat of an automobile, said car seat mat consisting of a flexible waterproof sheet member, said sheet member having a main section and a lip portion coextensive with said main section; said sheet lip portion sized for conforming to the seat portion of the child's restraint seat, and said sheet main portion sized for overlapping the vertical car body panel straddling the front end of the fixed seat and the automobile flooring; a first, transverse, substantially rigid flange depending from a first face of said car seat mat and extending in between said sheet main portion and said sheet lip portion; and a second, transverse, substantially rigid flange depending from said first face of the car seat mat and extending at an end edge section of said sheet main portion opposite said first flange; said first flange sized for flat abutment against the front end portion of the child's restraint seat, and said second flange adapted to form a water (or dirt or sand) collecting pocket in spaced overlying fashion relative to the car flooring, when the child's restraint seat is mounted over the car fixed seat; wherein said sheet member can positively shield said car fixed seat and said car body vertical panel, from accidental dirt spills generated by the stained footwear, or bare feet, or boots of an infant sitting in the child's restraint seat.

Preferably, there are provided a number of laterally spaced ribs, extending over said sheet main portion generally orthogonally to said flanges, for directing dirt spills fluid flow from said first flange into said second flange water pocket.

Said first flange could be inclined away from said sheet main portion, so that an obtuse angle be defined between said first flange and said sheet main portion; and with the transverse depth of said sheet first flange being preferably much greater than that of said sheet second flange. A safety belt aperture could be provided, being made in said sheet lip portion, for enabling free through passage of the car safety belt to loop around the seat crib.

It is envisioned to add a pair of laterally opposite edge ribs, extending over the opposite lateral edges of said sheet main portion and projecting from said sheet main portion first face, for preventing accidental lateral outflow escape of water flowing from said first flange to said second flange. Preferably, a pair of short angle ribs will also be added, projecting transversely from said sheet main portion first face and transversely with corresponding said edge ribs with which they merge, said angle ribs forming a large acute angle with a plane parallel to that intersecting said first flange, wherein water flowing from said first to said second flanges along the edge portions of said main portion is deflected by said angle ribs into the intermediate section of said second flange water pocket. Also, said second flange would advantageously carry on its interior face a number of laterally spaced anti-splatter ribs, thus forming a plurality of sub-pockets inside the main said water pocket formed by said second flange, said anti-splatter ribs destined to prevent accidental lateral water motion of the body of water trapped inside said main water pocket as induced by vehicle borne inertial loads.

Said first flange could include an intermediate recess, said recess for through passage of a user's hand in accessing therebehind the child's seat belt release button.

Preferably, said first face of said lip portion includes a plurality of first integral discrete friction fit members that outwardly project therefrom, and a second face of said lip portion opposite said first face thereof also including a plurality of second integral discrete friction fit members that outwardly project therefrom; wherein said first friction fit members are adapted to frictionally engage with the underface of the child's restraint seat, for preventing accidental lateral shift of the mat relative to the child's restraint seat, and wherein said second friction fit members are adapted to frictionally engage with the car seat, for preventing accidental lateral shift of the mat relative to the car seat.

BRIEF DESCRIPTION OF THE DRAWINGS

FIG. 1 is a top plan view of a preferred embodiment of car seat mat according to the invention;

FIG. 2 is an edge view of the car seat mat of FIG. 1;

FIG. 3 is a side elevational view of the inside of a car cockpit, showing an infant sitting on a child's restraint seat and attached thereto by the car safety strap, and with the car seat mat being mounted in between the car back seat and the child's restraint seat;

FIG. 4 is an enlarged view of FIG. 3, without an infant, suggesting how the load bearing play of the frictional studs carried by the underface of the car mat; and FIG. 5 is an enlarged isometric view of the interior face of flap 16, suggesting how the anti-splatter flaps 30 form laterally spaced water pockets to retain slush against accidental lateral motion along flap 16.

DETAILED DESCRIPTION OF THE PREFERRED EMBODIMENT OF THE INVENTION

The car seat mat 10 is formed by a generally flat, waterproof, flexible sheet 12 transversely carrying an intermediate rigid flange 14 and a rigid end edge flange 16. The car seat mat 10 should be made from a suitable thermoplastic material, preferably being polyvinyl chloride (PVC) because of its low cost, although other materials, such as urethane, would not be excluded from the scope of the invention. Intermediate flange 14 is much thicker than main sheet 12, wherein it becomes "rigid" so that its angular relation with the plane of the adjacent section of the main sheet 12 remains constant. Intermediate flange 14 makes a large acute angle relative to the tapered lip portion of 18 of main sheet 12, opposite edge flange 16, and includes a number of transverse ribs 20 on its obtuse angle face. Said lip portion 18 of main sheet 12 opposite flange 16 tapers widthwisely, and circumscribes a somewhat ovoidal aperture 22. Aperture 22 may form a handle, for carrying the car seat mat 10, but its main purpose is to allow free through passage of the car safety belt in attaching the infant crib C to the car frame.

The sheet main portion 24 between flanges 14 and 16 also includes a number of ribs 20', all generally parallel to ribs 20 and preferably coextensive therewith.

The end flange 16 makes a large acute angle relative to main sheet portion 24, is substantially rigid and is shorter in depth (relative to the plane of sheet portion 24) compared to flange 14. Flange 16 forms a pocket which will collect and retain water and other liquids from the child's stained boots, flowing downwardly under gravity along sheet portion 24.

Moreover, the opposite end portions 16a, 16b, of flange 16 are slightly upwardly inclined, i.e. angled toward the side of flange 14, to close the lateral sides of the water pocket formed by flange 16, wherein pocket 16 will effectively retain liquids spacedly over the car flooring. Also, as illustrated in FIG. 5, the interior wall of flange 16 (facing flange 14) should preferably include a number of transverse, anti-splatter ribs 30, intended to prevent accidental lateral water motion of the body of water trapped inside pocket 16, as induced by vehicle borne inertial (mainly centrifugal) loads.

As illustrated in FIG. 3, in operation, the car seat mat 10 is positioned beneath a child's restraint seat C, with the sheet portion 18 being inserted generally horizontally between the car back seat S and the child's restraint seat C, and with the standard safety strap of the car freely extending through aperture 22 and looping around crib seat C. The other sheet portion 24 forms a flexible flap that bends downwardly to overlap the contour of the front edge portion Se of the car seat S and the car body vertical panel P straddling front seat portion Se and car flooring F, down to the flooring F between the car back seat S and the car front seat R. Intermediate flange 14 is positioned to flatly and frictionally abut against the front edge portion Ce of the child's restraint seat C.

It can now be understood that the purpose of flap 14, when applied against the front wall Ce of seat C, is to prevent mud, snow, slush U, or other debris from the infant's boots from accidentally backflowing, to reach and stain the top surface of the car back seat S. Ribs 20, 20' cooperate in directing these boots fallouts under gravity-borne forces toward the car flooring F. Smaller end flap 16, located adjacent the car flooring F, prevents the boots liquid debris from backflowing behind the sheet portion 22 and against vertical body panel P. Inclined flange 14 should be deep enough (i.e. raise to a sufficient height) to effectively shield the front end of the child's restraint seat, while not being deep enough to prevent the infant from extending his feet thereabove (as suggested in FIG. 3).

It is noted that, even though the car seat mat 10 has been illustrated in use over the rear integral seat of an automobile, nothing prevents efficient use thereof over the right-hand side front integral seat of the automobile (i.e., that seat which is not behind the steering wheel of the car).

Preferably, and as shown in FIG. 1, small ovoidal bores 29 are provided at the corner portions of main sheet portion 24 and behind flange 16, for engagement by wall nails, wherein the mat 10 can be hanged spacedly over ground for promoting faster air drying and facilitated cleansing thereof.

Inclined flange 14 should include an intermediate recess 28, for enabling manual access therethrough to reach the buckled seat belt release button that controls the seat belt attaching the infant to the child's restraint system.

Preferably, and as suggested in FIGS. 1 and 2, the lateral side ribs 25 of the main sheet portion 24 are transversely (upwardly) inclined, to prevent accidental spill-overs of liquid from the mat top surface 24 laterally outwardly therefrom.

Preferably also, a pair of short angle ribs 26, 26, are provided transversely of sheet portion 24, proximate the lateral edge portions of flange 16 and merging with the ends of side ribs 25, 25, respectively. Angle ribs 26, 26, are slightly interiorly inclined toward the intermediate section of flange 16, generally parallel to flange end sections 16a and 16b, respectively, so as to deflect interiorly any liquid that flows proximate the lateral edges 25, 25, of the mat sheet 24.

Preferably, the top surface of lip portion 18, which is directly engaged by the undersurface of overlying crib seat C, includes a plurality of small integral projecting fingers 31. Fingers 31 operate as friction members that contribute in frictionally anchoring lip 18 to seat C, to prevent accidental sliding release of the mat 10 from the seat C.

Preferably also, similar small integral projecting fingers 32, shown in FIGS. 2 and 4, are provided to the undersurface of the seat mat lip portion 18. Again, fingers 32 operate as friction members that contribute in frictionally anchoring lip 18 to car seat S to prevent accidental sliding shifts of the mat 10 over the car seat S. Accordingly, thanks to the combined actions of friction fingers 31 and 32, mat 10 is frictionally locked to both car seat S and crib seat C, particularly under the weight of an infant sitting in child's restraint seat C.

In an alternate embodiment, not illustrated, the present car seat mat would be removably attached to either the bottom wall of the crib seat C, with panel 18, or to the front end of the crib seat C, with panel 14, via suitable releasable anchoring means (not illustrated).

The embodiments of the invention for which an exclusive property or privilege is claimed, are defined as follows:

1. A car seat mat for use with a removable child's restraint seat over an integral fixed seat of an automobile, said car seat mat consisting of a flexible waterproof sheet member, said sheet member having a main portion and a lip portion coextensive with said main portion; said sheet lip portion sized for conforming to a seat portion of the child's restraint seat, and said sheet main portion sized for overlapping a vertical car body panel straddling the front end of the fixed seat and the automobile flooring; a first, transverse, substantially rigid flange depending from a first face of said car seat mat and located at the junction of said sheet main portion and said sheet lip portion; and a second, transverse, substantially rigid flange extending outwardly from said first face of the car seat mat and extending at an end edge section of said sheet main portion opposite said first flange; said first flange sized for flat abutment against a front end portion of the child's restraint seat, and said second flange adapted to form a water collecting pocket in spaced overlying fashion relative to the car flooring, for when the child's restraint seat is mounted over the car fixed seat;

wherein said sheet member is for shielding said car fixed seat and said car body vertical panel from accidental dirt spills generated by the stained boots of an infant sitting in the child's restraint seat.

2. A car seat mat as defined in claim 1, further including a number of laterally spaced ribs, extending over said sheet main portion generally orthogonally to said flanges, for directing dirt spills fluid flow from said first flange into said second flange water pocket.

3. A car seat mat as defined in claim 2, further including a pair of laterally opposite edge ribs, extending over the opposite lateral edges of said sheet main portion and projecting from said sheet main portion first face, for preventing accidental lateral outflow escape of water flowing from said first flange to said second flange.

4. A car seat mat as defined in claim 3, further including a pair of short angle ribs, projecting transversely from said sheet main portion first face and transversely with corresponding said edge ribs with which they merge, said angle ribs forming a large acute angle with a plane parallel to that intersecting said first flange, wherein water flowing from said first to said second flanges along the edge portions of said main portion is deflected by said angle ribs into the intermediate section of said second flange water pocket.

5. A car seat mat as defined in claim 4, wherein said second flange carries on its interior face a number of laterally spaced anti-splatter ribs, thus forming a plurality of sub-pockets inside the main said water pocket formed by said second flange, said anti-splatter ribs destined to prevent accidental lateral water motion of the body of water trapped inside said main water pocket as induced by vehicle borne inertial loads.

6. A car seat mat as defined in claim 1, wherein said first flange is inclined away from said sheet main portion, so that an obtuse angle be defined between said first flange and said sheet main portion.

7. A car seat mat as defined in claim 6, wherein said sheet first flange extends outwardly a distance much greater than that of said sheet second flange.

8. A car seat mat as defined in claim 1, further including a safety belt aperture, made in said sheet lip portion, for enabling free through passage of a car safety belt to loop around the child's restraint seat.

9. A car seat mat as defined in claim 1, wherein said first flange includes an intermediate recess, said recess for through passage of a user's hand in accessing therebehind the child's seat belt release button.

10. A car seat mat as defined in claim 1, wherein said first face of said lip portion includes a plurality of first integral discrete friction fit members that outwardly project therefrom, and a second face of said lip portion opposite said first face thereof also including a plurality of second integral discrete friction fit members that outwardly project therefrom; wherein said first friction fit members are adapted to frictionally engage with the underface of the child's restraint seat, for preventing accidental lateral shift of the mat relative to the child's restraint seat, and wherein said second friction fit members are adapted to frictionally engage with the car seat, for preventing accidental lateral shift of the mat relative to the car seat.

* * * * *